Sept. 13, 1932.   H. G. MANNING   1,876,993
STEERING WHEEL GRIP
Filed Nov. 27, 1928
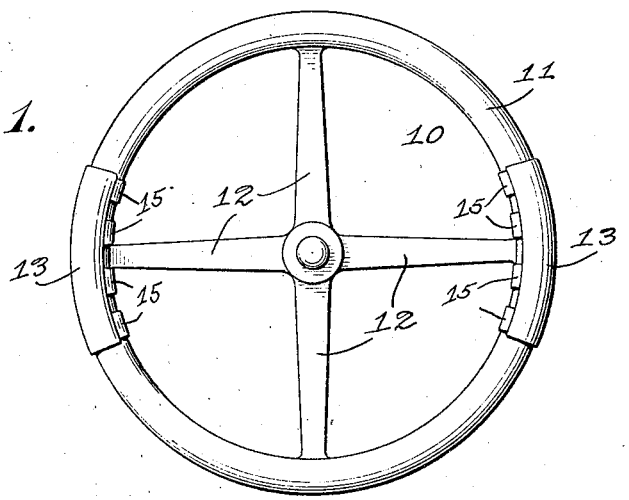
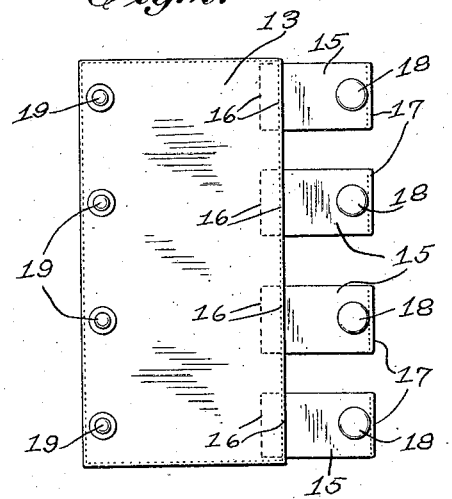
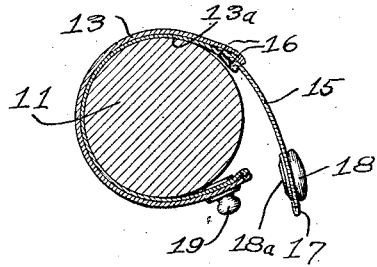
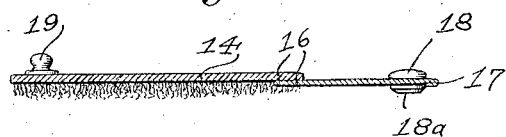
INVENTOR
Harold G. Manning Patented Sept. 13, 1932

1,876,993

UNITED STATES PATENT OFFICE

HAROLD G. MANNING, OF WATERBURY, CONNECTICUT

STEERING WHEEL GRIP

Application filed November 27, 1928. Serial No. 322,190.

This invention relates to steering wheel grips to be applied to the rim of a steering wheel in order to prevent the driver's hands from becoming soiled, and to increase the comfort of driving.

One object of this invention is to provide a steering wheel grip of the above nature which is adapted to be secured to the steering wheel by a plurality of elastic attaching strips located on the inside of the rim so that they will not interfere with the hands of the driver.

A further object is to provide a steering wheel grip of the above nature in which the elastic attaching strips are adapted to embrace the spokes of the steering wheel to prevent all possibility of slippage of the grip along the rim.

A further object is to provide a steering wheel grip of the above nature in which the driver's grasp upon the wheel will be improved, thereby permitting greater facility in the handling of the car.

A further object is to provide a steering wheel grip made of absorbent heat insulating material to absorb perspiration and prevent the driver's hands from getting hot in summer and to protect his hands from the cold wheel in winter.

A further object is to provide a device of the above nature which will be simple in construction, inexpensive to manufacture, adjustable to various sizes of wheels, easy to install and manipulate, compact, attractive in appearance, and very efficient and durable in use.

With these and other objects in view there have been illustrated on the accompanying drawing two forms in which the invention may be conveniently embodied in practice.

Fig. 1 represents a plan view of a steering wheel having a pair of protecting grips assembled thereon.

Fig. 2 is a plan view of a protecting grip in flat open position.

Fig. 3 is a sectional view of one of the protecting grips as it appears when positioned upon the steering wheel rim with the elastic strips in open position.

Fig. 4 is a sectional view in flat open position of a modified form of steering wheel protecting grip in which the grip is formed of unsheared sheepskin to provide a soft outer surface.

Referring now to the drawing in which like reference numerals denote corresponding parts throughout the several views, the numeral 10 indicates generally a steering wheel having a rim 11 and a plurality of spokes 12, four in this instance. Ordinarily two protecting grips will be applied to the rim 11 at opposite sides thereof as shown in Fig. 1. One of the grips is shown in flat open position in Fig. 2 and comprises a rectangular sheet 13 of soft flexible absorbent fabric having a lining 13a, as shown in Fig. 2, or unsheared leather 14, as shown in Fig. 4. Attached to one edge of the sheet 13 are a plurality of rectangular strips 15 of elastic fabric, said strips 15 being secured to said sheet 13, as by two rows of stitching 16, and having their extremities 17 folded over for strengthening the construction.

In order to permit the sheet 13 to be held tightly upon various sizes of rims 11 without slipping, each elastic strip 15 is provided at its extremity with a snap fastener socket 18 having an opening 18a on its under side, as viewed in Fig. 2. Each snap socket 18 is adapted to be forced down upon a snap plug 19 which is located along the opposite side edge of the sheet 13 (or 14) in alinement with the socket 18, there being four sockets and four snap plugs in this instance.

In operation, when it is desired to assemble the grip upon the steering wheel rim, it is only necessary to apply the sheet 13 (or 14) to the outer part of the rim 11 in such a manner that the snap plugs 19 will lie upon the outer side thereof. While the sheet is held in one hand, the elastic strips 15 will then be stretched, one at a time, around the interior of the rim 11, permitting the snap sockets 18 to be detachably locked upon the snap plugs 19. If it should be desired to change the position of the grip 13 upon the rim 11, as from the position shown in Fig. 1 where the spoke is located between the two central elastic strips 18, it will only be necessary to unfasten said central strips and slide the grip along the rim in the desired direction to bring the spoke 12 between one of the central strips 15 and an end strip. It is also within the spirit of this invention to secure the steering wheel grip to the rim 11 at any intermediate point between the spokes 12, as the elastic strips will ordinarily serve to prevent slippage.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a steering wheel grip, a sheet of rectangular flexible absorbent material for embracing the outer surface of a portion of the steering wheel rim, a plurality of closely spaced parallel rectangular elastic strips attached to one edge of said sheet, and means to fasten the ends of said strips to the other edge of said sheet, said elastic strips being spaced apart to permit any adjacent pair to closely embrace one of the spokes of the steering wheel to position said grip relative to said wheel.

In testimony whereof, I have affixed my signature to this specification.

HAROLD G. MANNING.